Aug. 28, 1956     A. M. MOOS ET AL     2,761,070
DOSIMETER
Filed Aug. 20, 1953
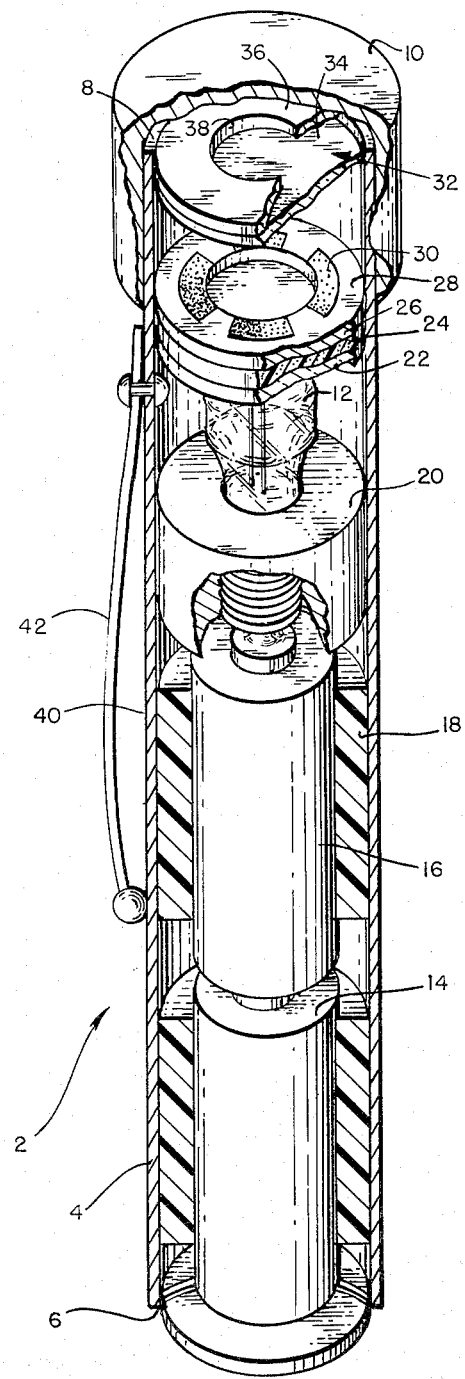
INVENTORS,
ANTHONY M. MOOS
STANLEY WALLACK
BY
*Harry M. Saragovitz*
ATTORNEY United States Patent Office 2,761,070
Patented Aug. 28, 1956

2,761,070

DOSIMETER

Anthony M. Moos, Ossining, and Stanley Wallack, Jackson Heights, N. Y., assignors to the United States of America as represented by the Secretary of the Army Application August 20, 1953, Serial No. 375,582

7 Claims. (Cl. 250—71)

The present invention relates to gamma ray dosimeters and more particularly to a compact portable dosimeter of the direct reading type utilizing infra red sensitive phosphors as the dose measuring and indicating element.

A phenomenon associated with phosphors which has long been known is the "flash" of light emitted by certain phosphors when exposed to infra red radiation. Thus, when one of these phosphors is excited by ultra violet light, visible light, radioactive particles or ionizing radiation, a certain brightness of flash will be superimposed upon the normal phosphorescent afterglow when the sample is exposed to infra red radiation. The intensity of this flash will differ for different materials and will also depend upon the wavelength of the radiation.

In the operation of this phenomenon, it is believed that the exposure of an infra red sensitive phosphor to radiation results in the elevation of an electron from the ground state to a trapping or metastable state from which it cannot return directly to the ground state. However, infra red radiation supplies enough energy to the electron to raise it from this metastable state to the conduction zone from which it returns to the ground state with the emission of its characteristic radiation. During stimulation the electrons are in the conduction zone and the phosphor will thus exhibit the property of photoconductivity.

There are many phosphors which show high stimulability under infra red radiation. Examples of such phosphors are strontium sulfide activated by samarium and europium, strontium sulfide activated with samarium and cerium, strontium selenide containing sulfur and activated with samarium and europium and zinc sulfide activated with lead and copper.

A property common to all of these phosphors is the ability to store energy received as incoming radition and later to liberate this energy in the form of light quanta when stimulated by radiation of the proper wavelength. It can readily be seen that such infra red sensitive phosphors may be utilized either alone or in combination with phosphors having high absorption of beta, gamma and x-radiation as the basic element of a dosimeter. The infra red sensitive phosphor becomes excited and subject to radiation and stores this energy until a future time when it is stimulated by infra red radiation whereupon it emits light. The brightness of the light emitted bears a simple relationship to the roentgen dosage received and in this manner the integrated dosage received over a period of time may be determined.

Heretofore, in dosimeters of the infra red phosphor type, the quantity of visible light emitted by the phosphor has been measured by a light meter or a photo multiplier tube assembly. The source of infra red light and the light meter have generally been incorporated in a measuring instrument which has been calibrated for known dosages of gamma radiation. Such calibrated measuring instruments are usually referred to as dosimeter adaptors. The need for light meters or photo multipliers in such instruments has presented in addition to their complexity, the disadvantage of not being of a direct reading type but a device requiring a second instrument to measure the dosage of radiation exposure.

It is accordingly the primary object of the present invention to provide a gamma ray dosimeter utilizing as the sensitive element therein, a phosphor or a combination of phosphors capable of storing the energy of gamma radiation and releasing the energy of such radiation upon being stimulated by infra red light.

It is a further object to provide a portable reusable dosimeter of a direct reading type which upon exposure to gamma radiation is capable of storing part of the energy of such radiation for relatively long periods of time and, upon subsequent exposures to infra red light, releasing said energy in the form of visible light and indicating the level of said radiant energy.

In accordance with the present invention there is provided a housing which is opaque to infra red, ultra violet and visible light and transparent to gamma radiation and including therewithin a source of infra red light, an infra red sensitive phosphor material responsive to such light, the phosphor being capable of storing the energy of gamma radiation and releasing such energy as visible light upon being exposed to infra red light and one or more discrete phosphorescent areas having predetermined emitted light intensities corresponding to chosen dosages of gamma radiation whereby a standard of comparison is provided for the light emitted from the phosphor.

For a better understanding of the invention together with other and further objects thereof, reference is had to the following description taken in connection with the accompanying drawing and its scope will be pointed out in the appended claims.

Referring now to the drawing, there is shown in perspective, partly cut away, a preferred embodiment of the present invention. The dosimeter 2 comprises a cylindrical housing 4 having a closed end 6 and an open end 8 and a removable closure member 10 for open end 8. Housing 4 and closure member 10 are made of a material such as aluminum or other like substance which is opaque to infra red, ultra violet and visible light and transparent to gamma radiation. Within housing 4 is a light bulb 12 such as a 3 volt lamp and batteries 14 and 16 for supplying power to the bulb. Spacer sleeves 18, made of a material such as a phenolic plastic, are provided as shown to position the batteries snugly inside the housing. A switch (not shown) is provided for opening and closing the circuit between batteries 14 and 16 and bulb 12. Intermediate battery 16 and bulb 12 is a socket 20 for threadably engaging bulb 12 to effect firm contact between bulb and battery 16. Spaced a small distance from bulb 12 is a transversely disposed infra red filter 22 which is opaque to all light from bulb 12 except that in the infra red region. Juxtaposed and in intimate contact with filter 22 is a disc 24 comprising an infra red sensitive phosphor and a transoptic powder. The phosphor may be any composition which possesses the property of storing the energy of gamma radiation for relatively long periods of time after having been subjected to such radiation and being capable of then emitting the energy as visible light of an intensity corresponding to the integrated gamma radiation when later exposed to infra red radiation. There are many such phosphors known in the art such as the Standard VII group. Phosphors having the following formulas: SrSe (0.012 Sm, 0.005 Eu) 10 SrCl$_2$ and 100 SrSe:4 CaS(0.012 Sm, 0.005 Eu) 10 SrCl$_2$ are preferable for this use. The transoptic powder may comprise an acrylic molding powder. It has been found that a preferred ratio of materials in the disc is about 3% phosphor and the remainder transoptic powder. At lower concentrations, the resultant disc is not of sufficient brightness when stimulated by infra red light and at higher concentrations, the sealing effect of the acrylate plastic is diminished and the phosphor deteriorates due to moisture.

Juxtaposed with disc 24 is a flat ring 26 having on its exposed surface 28 several phosphorescent paint areas such as 30. These areas are severally calibrated to emit visible light of a brightness and intensity equal to that of visible light emitted by the phosphor in disc 24 upon the discs being exposed to infra red light after having been submitted to chosen dosages of gamma radiation; each fluorescent paint area contains a radioactive emitter so as to be self-luminescent, each area being calibrated to correspond to a different dosage value. Intermediate open end 8 of housing 4 and exposed surface 28 of ring 26 is an eyepiece assembly 32 comprising a transversely disposed infra red blocking filter 34 spaced from exposed surface 28 which prevents excitation of phosphor in disc 24 by infra red light and a ring 36 on filter 34 intermediate filter 34 and open end 8 having a centrally disposed hole 38 therethrough for viewing disc 24 through filter 34. Affixed to the external surface 40 of housing 5 is a clip 42, substantially as shown, for securing the dosimeter to the clothing of a person utilizing it.

In operation, after dosimeter 2 has been subject to gamma radiation, closure member 10 is removed from housing 4, light bulb 12 is switched on and the light emitted by the phosphor is viewed through eyepiece 32. The light from bulb 12 is filtered through infra red filter 22 so that phosphor disc 24 is exposed only to infra red light. Upon being so exposed, the phosphor emits visible light, the intensity of the light depending on the dosage of the gamma radiation to which the phosphor had been subjected. Since each phosphorescent paint area 30 emits light having an intensity corresponding to the intensity of the infra red stimulated phosphor for a predetermined gamma radiation dosage, the brightness of the emitted light from the exposed phosphor and the calibrated phosphorescent paint areas respectively are readily visibly compared. After the brightness of emitted light has been observed, continued stimulation by infra-red light will cause the emitted light to drop to zero, after which the dosimeter is ready for re-use.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A dosimeter for gamma radiation comprising a housing, which is opaque to infra red, ultra violet and visible light and transparent to gamma radiation and including therewithin a source of infra red light, an infra red sensitive phosphor material responsive to the infra red light, the phosphor being capable of storing the energy of the gamma radiation and releasing such energy as visible light upon exposure to infra red light and light emitting means having predetermined intensities for comparing the brightness of the visible light released by the phosphor.

2. A dosimeter as in claim 1 wherein the source of infra red light comprises a light bulb, batteries for supplying power to said bulb and filter means opaque to ultra violet and visible light and transparent to infra red light.

3. A dosimeter for gamma radiation comprising a housing and a removable closure member therefor which are opaque to infra red, ultra-violet and visible light and transparent to gamma radiation, the housing including therewithin a source of infra red light, an infra sensitive phosphor material responsive to said infra red light, the phosphor being capable of storing the energy of the gamma radiation and releasing such energy as visible light upon exposure to infra red light, discrete light emitting means having predetermined intensities for comparing the brightness of the visible light released by the phosphor.

4. A dosimeter for gamma radiation comprising a substantially cylindrical housing and a removable closure member therefor which are opaque to infra red, ultra violet and visible light and transparent to gamma radiation, the housing including therewithin an infra red light source comprising a light bulb, batteries for supplying power to said bulb and a filter opaque to ultra violet and visible light and transparent to infra red light, a disc including an infra red sensitive phosphor material juxtaposed and in intimate contact with the infra red filter, the phosphor being capable of storing the energy of gamma radiation and releasing such energy as visible light upon exposure to infra red light, a flat ring, one surface thereof in abutment with the phosphor disc, a plurality of phosphorescent areas on the other surface of the ring for comparing the brightness of the visible light released by the phosphor, the phosphorescent areas emitting light of different intensities corresponding to predetermined dosages of gamma radiation.

5. A dosimeter as in claim 4 wherein said disc of phosphor material comprises about 3% infra red sensitive phosphor and the remainder an acrylate resin.

6. A dosimeter for gamma radiation comprising a substantially cylindrical housing having one open end and a removable closure member for the open end, the housing and the closure member being transparent to gamma radiation and opaque to infra red, ultra violet and visible light, the housing including therewithin a source of infra red light comprising a light bulb, batteries for providing power to the bulb and an infra red filter, means juxtaposed with the infra red filter and responsive to infra red light comprising a disc including about 3% by weight of an infra red sensitive phosphor which is capable of storing the energy of gamma radiation and releasing such energy as visible light upon being exposed to infra red light and the remainder a transoptic powder, a flat ring on the disc, one surface thereof in abutment with the phosphor disc, a plurality of discrete phosphorescent areas on the other surface of the ring, the phosphorescent areas emitting visible light of different intensities corresponding to predetermined dosages of gamma radiation and a filter opaque to infra red light positioned within the housing and between said flat ring and the open end of the housing.

7. A dosimeter as in claim 6, wherein the transoptic powder comprises an acrylate resin.

References Cited in the file of this patent

UNITED STATES PATENTS

| | | |
|---|---|---|
| 2,392,979 | Douden | Jan. 15, 1946 |
| 2,616,051 | Daniels | Oct. 28, 1952 |
| 2,649,837 | Wiese | Aug. 25, 1953 |